(12) United States Patent
Bjorstrom et al.

(10) Patent No.: US 7,016,159 B1
(45) Date of Patent: Mar. 21, 2006

(54) DISK DRIVE HEAD SUSPENSION WITH SPRING RAILS FOR BASE PLATE MICROACTUATION

(75) Inventors: Jacob D. Bjorstrom, Waconia, MN (US); Reid C. Danielson, Cokato, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 46 days.

(21) Appl. No.: 10/201,834

(22) Filed: Jul. 24, 2002

Related U.S. Application Data

(60) Provisional application No. 60/307,448, filed on Jul. 24, 2001.

(51) Int. Cl.
*G11B 5/55* (2006.01)

(52) U.S. Cl. .................................. 360/294.6
(58) Field of Classification Search ............. 360/294.6, 360/294.4
See application file for complete search history.

(56) References Cited

U.S. PATENT DOCUMENTS

| | | | |
|---|---|---|---|
| 5,598,307 A | 1/1997 | Bennin | |
| 5,781,381 A | 7/1998 | Koganezawa et al. | |
| 5,835,306 A | 11/1998 | Bennin | |
| 5,914,839 A | 6/1999 | Matsuzono et al. | |
| 5,933,293 A | 8/1999 | Bennin | |
| 6,072,665 A | 6/2000 | Ferrari et al. | |
| 6,134,087 A | 10/2000 | Khan et al. | |
| 6,157,522 A * | 12/2000 | Murphy et al. | 360/294.6 |
| 6,188,548 B1 * | 2/2001 | Khan et al. | 360/294.4 |
| 6,239,953 B1 * | 5/2001 | Mei | 360/294.6 |
| 6,331,923 B1 * | 12/2001 | Mei | 360/294.4 |
| 6,335,848 B1 * | 1/2002 | Mei | 360/294.4 |
| 6,404,600 B1 * | 6/2002 | Hawwa et al. | 360/294.4 |
| 6,411,475 B1 * | 6/2002 | Khan et al. | 360/294.4 |
| 6,614,627 B1 * | 9/2003 | Shimizu et al. | 360/294.4 |
| 6,624,982 B1 * | 9/2003 | Masuda et al. | 360/294.4 |
| 6,731,472 B1 * | 5/2004 | Okamoto et al. | 360/294.3 |

FOREIGN PATENT DOCUMENTS

JP 62075988 4/1987

OTHER PUBLICATIONS

Excerpts from Magnecomp presentation at "Head/Media Las Vegas '99 Proceedings" 2 pgs.

* cited by examiner

*Primary Examiner*—Angel Castro
(74) *Attorney, Agent, or Firm*—Faegre & Benson LLP

(57) ABSTRACT

A base plate for a head suspension assembly having a pair of side rails including spring portions. The base plate including first and second portions connected by the pair of side rails and separated by an opening, with the spring portions positioned adjacent to the opening. The base plate configured to receive a microactuator spanning the opening with the microactuator causing relative movement between the first and second portions of the base plate at the spring portions of the side rails, so as to provide fine manipulation of a head slider mounted to the head suspension assembly.

44 Claims, 5 Drawing Sheets

DISK DRIVE HEAD SUSPENSION WITH SPRING RAILS FOR BASE PLATE MICROACTUATION

The present application claims priority to U.S. provisional application Ser. No. 60/307,448, entitled DISK DRIVE HEAD SUSPENSION WITH SPRING RAILS FOR BASE PLATE MICROACTUATION, filed on Jul. 24, 2001, which is herein incorporated by reference in its entirety.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk which is referred to as the "fly height."

Head suspensions for rigid disk drives typically include a base plate, load beam and a flexure. The base plate provides a connection between the suspension and the primary actuator of the disk drive and may be a swage plate type base plate that mounts via swaging to member driven by an actuator. Alternatively, the base plate may be a unamount style arm that mounts directly to the actuator. The load beam typically includes a mounting region at its proximal end for mounting the head suspension to an actuator of the disk drive, typically at a base plate of the head suspension. The load beam also includes a rigid region and a spring region between the mounting region and the rigid region for providing a spring force to counteract the aerodynamic lift force generated on the head slider during the drive operation as described above. The flexure typically includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions to follow disk surface fluctuations.

In one type of head suspension the flexure is formed as a separate piece having a load beam mounting region which is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam, or gram load, to the flexure, provides clearance between the flexure and the load beam, and functions as a point about which the head slider can gimbal in pitch and roll directions to follow fluctuations in the disk surface.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track. Attempts to improve this situation have included the provision of another orsecondary actuator or actuators, such as a piezoelectric, electrostatic or electromagnetic microactuator or fine tracking motor, mounted on the head suspension itself. These types of actuators are also known as second-stage microactuation devices and may be located at the base plate, the load beam or on the flexure.

The need for slight but controlled positional adjustments of a head slider on a disk drive head suspension during operation of the disk drive is becoming increasingly necessary due to trends in the industry. Various methods of providing such positional adjustment have been proposed. As stated above, one such method includes the use of microactuators, such as piezoelectric elements, on disk drive head suspensions to provide on-the-fly positional adjustments to the head suspension and head slider. Within this area of microactuated head suspensions, there is a need to improve actuator stroke while still achieving high resonance frequencies and low motor gram share in the head suspensions. Motor gram share is the amount of force from the gram load that is transmitted through the microactuators. Ideally, this gram share force is zero, but in actuality some force is usually present. There is also a need to be able to accommodate windage requirements in the load beam while achieving increased stroke values.

SUMMARY OF THE INVENTION

The present invention provides a base plate for use in a head suspension assembly that supports a head slider over a disk in a disk drive. The base plate includes a pair of side rails formed with spring portions positioned adjacent to an opening in the base plate. The base plate is configured to received a microactuator spanning the opening, with the microactuator controlling fine motion of the head slider by manipulation of the base plate facilitated by the side rails.

The side rails are preferably formed integrally with the base plate out of the base plate material. The side rails extend out of the plane of the base plate, preferably substantially perpendicular to the plane of the base plate. The spring portions may be formed in many shapes or configurations, including but not limited to 'V' shape, 'U' shape, 'S' shape, square, rectangular, sinusoidal, corrugated and accordion pleated. The spring portions extend inward toward the opening or outward away from the opening. In one embodiment, the base plate including a drive mounting region and a load beam mounting region separated by the opening and joined by the side rails.

The present invention also provides a head suspension assembly including a base plate of the present invention. The head suspension assembly also includes a load beam mounted to the load beam mounting region, with the load beam including a flexure formed with the load beam or attached to the load beam. A microactuator mounted to the base plate spanning the opening controls movement of the flexure and thus a head slider mounted to the flexure.

The present invention also provides a method for forming a base plate of the present invention, including the steps of providing a planar base plate portion having an opening, forming a spring portion in the base plate material adjacent to the opening and forming side rails from the base plate material having the spring portion. In one embodiment, the base plate material is bent in a direction away from the plane of the base plate to form the spring portion. The spring portion material is then bent again toward the base plate to form the side rails.

DETAILED DESCRIPTION

Figure 1:
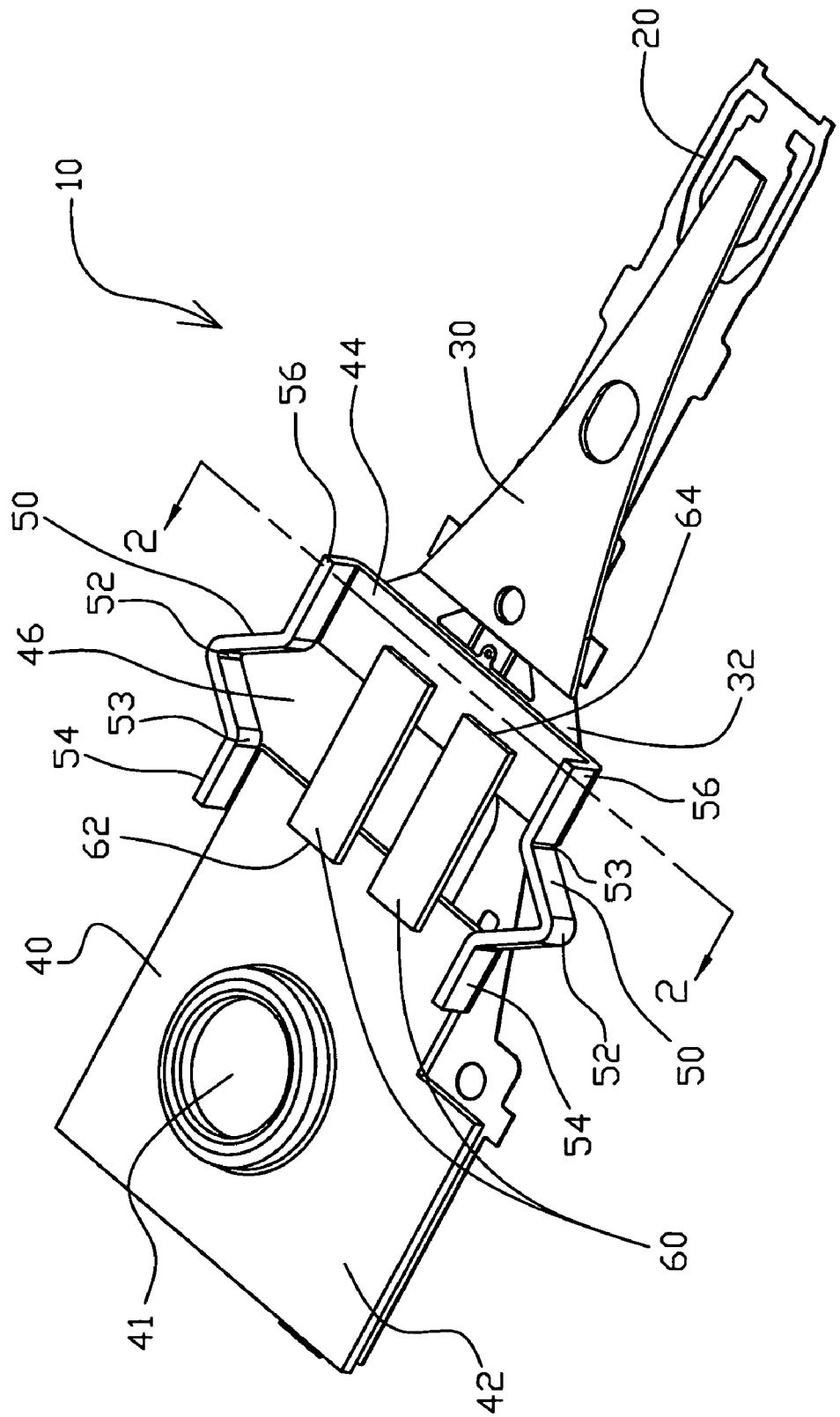
FIG. 1 is a perspective view of a head suspension assembly, including a base plate in accordance with the present invention.
Figure 2:
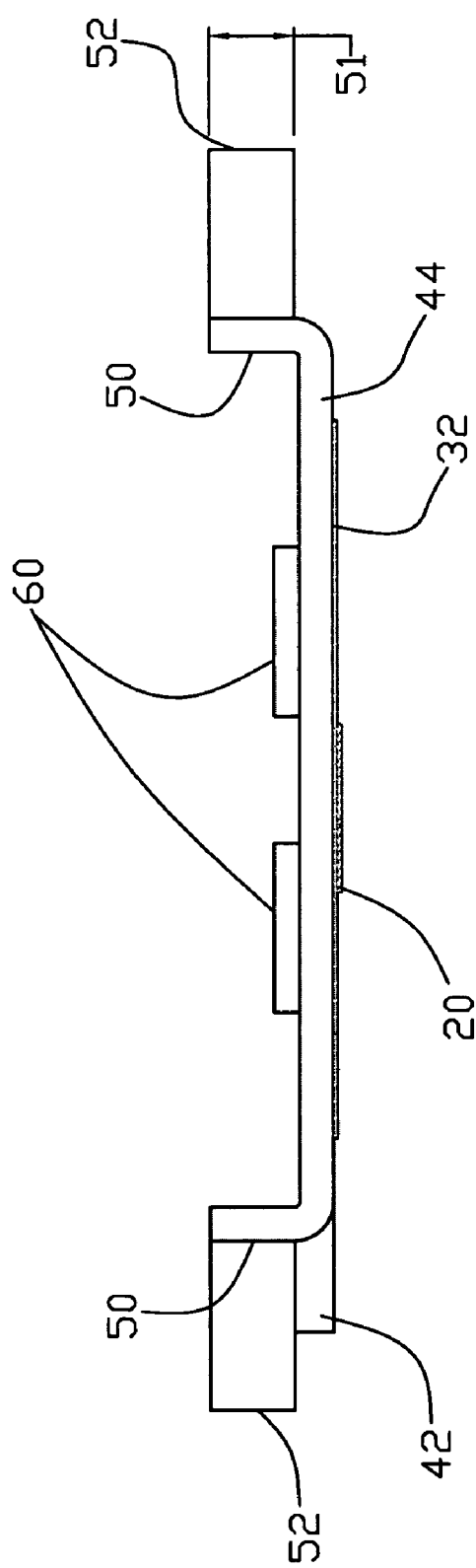
FIG. 2 is a cross-sectional view of the head suspension assembly taken along Line 2—2 of FIG. 1.

With reference to the attached Figures, it is to be understood that like components are labeled with like numerals throughout the several Figures. Referring now to FIGS. 1 and 2, a head suspension assembly 10 including a flexure 20, a load beam 30 and a base plate 40, is shown. In this embodiment, the base plate 40 includes a drive mounting region 42 and a load beam mounting region 44, which are connected by side rails 50, and a bore 41 for mounting to the head suspension drive or actuator. The load beam 30 mounts to the load beam mounting region 44 at a load beam mount 32 that may function as a separate spring region. As used herein, the term base plate refers to any member providing a connection between the suspension and a primary actuator for the disk drive. Although shown as a swage plate type base plate, it is to be understood that a unamount-style arm or other suitable member may also be used in the present invention and are included within use of the term base plate.

Between the load beam mounting region 44 and the drive mounting region 42 is an opening 46 bounded by the side rails 50. A pair of microactuators 60 are positioned to span the opening 46 by mounting at a first end 62 to the drive mounting region 42 and at a second end 64 to the load beam mounting region 44. The microactuators 60 are preferably piezoelectric motors, but may be any suitable actuation motor or device capable of causing movement of the load beam mounting region 44 with respect to the drive mounting region 42. Although shown in this embodiment as a pair of devices, the microactuators 60 may be a single device or may be more than two devices, as needed depending on the type of device provided and the type of movement desired.

In this embodiment, there is no center strut or other structural portion which spans the opening 46 between the microactuators 60, as is typically present in other prior art microactuated head suspension designs. As a result, the microactuators can determine the pivot point about which the movement of the head slider is made. Actuation of only one microactuator 60 can allow for very fine adjustments of the head slider position. Actuation of both microactuators 60 at the same time can provide for larger displacements of the head slider. The resulting movement of the head slider is generally lateral with a slight rotational component. This rotational component is amplified by the length of the load beam. The base plate 40 serves as a microactuator linkage having first and second members joined together by rails that provide for transverse movement between the these members, thereby resulting in movement of the head slider.

Figure 3:
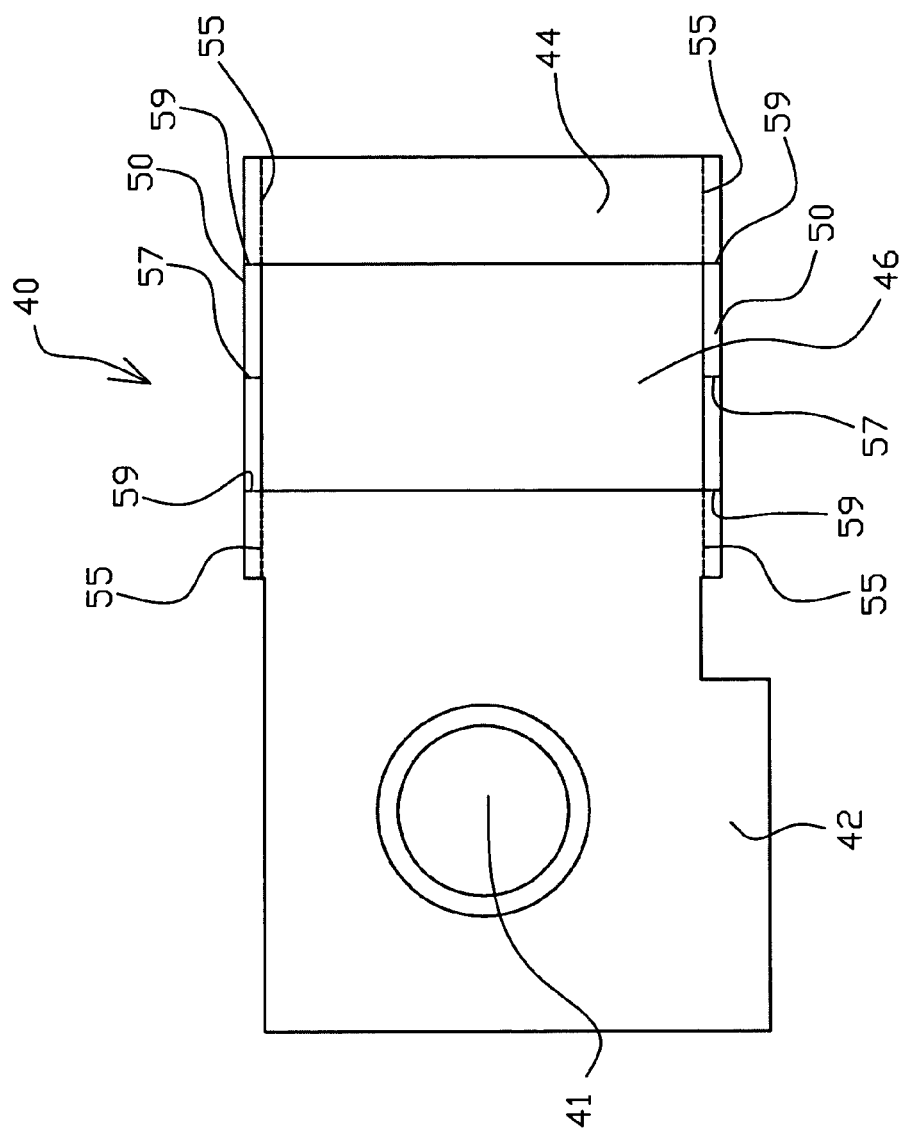
FIG. 3 is a top view of one embodiment of a base plate, in accordance with the present invention, in a preliminary form prior to fabrication of the final base plate configuration.
Figure 4:
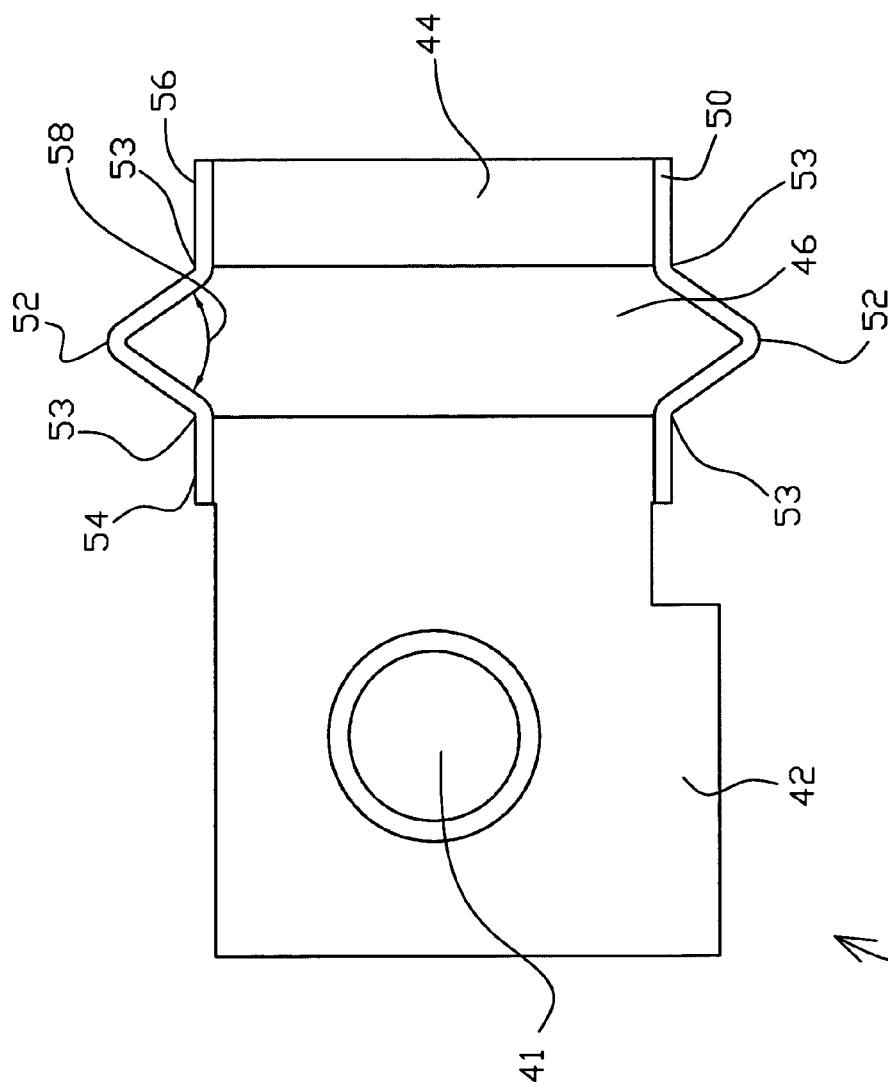
FIG. 4 is a top view of the base plate of FIG. 3, after fabrication into the final base plate configuration.

Referring now also to FIGS. 3 and 4, the side rails 50 are an integral part of the base plate 40 in the embodiment shown, and are formed from the base plate 40 to be substantially perpendicular to the plane of the base plate 40. As shown in FIG. 3, the base plate 40 can be formed from a single, relatively planar portion of material. In one embodiment, the material is preferably stainless steel having a thickness of about 0.2 millimeters(about 0.008 inches). This thickness will depend generally on the gram load of the head suspension and the mass of the load beam. Generally, a material thickness of about 0.010 inches is the preferred maximum, but thinner materials are preferred. In this preformed state, the opening 46 is longer in the longitudinal direction than it is in the formed state. The side rails 50 are formed by bending of the side rail material 50 at fold lines 57 out of the plane of the base plate 40 to form a spring portions 52, shown in this embodiment as a 'V' bend. In one embodiment, each spring portion 'V' bend 52 has an inside angle 58 of about 70 degrees. Formation of the spring portions 52 at lines 57 result in additional rail bends 53 at fold lines 59.

As the side rail material 50 is bent to form the spring portions 52, the load beam mounting region 44 moves longitudinally closer to the drive mounting region 42, thereby causing the opening 46 to become narrower in the longitudinal direction, but maintaining the area bounded by the side rails 50. Although shown in this embodiment as a 'V' shape, it is to be understood that the spring portion 52 may be formed in any of a number of different shapes that provide a suitable spring characteristic to the side rails 50. These shapes include, but are not limited to, a 'U' shape, a corrugated shape, a non-symmetrical 'V' shape, a square or rectangular shape, or other suitable configuration.

Preferably after the side rail material 50 is formed to include the spring portion 52, the side rail material 50 is bent out of the plane of the base plate 40 at fold lines 55. As a result, the side rails 50 are then substantially perpendicular to the plane of the base plate 40, as shown in FIG. 2, having a rail height 51 of about 0.5 millimeters (about 0.02 inches), in one embodiment. However, this rail height 51 may differ to meet space requirements or for other design or structural purposes, and may range from about 0.025 inches (about 0.64 millimeters) down to about 0.008 inches (about 0.20 millimeters) for thinner base plates, although other ranges of rail height are possible. After forming, the single piece base plate 40 in this embodiment is configured as shown in FIG. 4, with the side rails 50 having a 'V' bend spring portion 52 positioned to span the opening 46. Each side rail 50 includes a first rail portion 54 adjacent to the drive mounting region 42 and second rail portion 56 adjacent to the load beam mounting region 44. Each 'V' bend spring portion 52 protrudes outwardly away from the base plate 40 in a plane substantially parallel to the plane of the base plate 40. Although shown to protrude outwardly relative to the base plate 40, the spring portion 52 of the side rails 50 may be formed to protrude inwardly, if desired.

The 'V' bend spring portions 52 function as springs when the microactuators 60 are activated. Provision of the spring portions 52 in the side rails 50 results in an increased amount of stroke or slider movement due to the actuation of the microactuators 60. In one embodiment, the stroke can provide about ±1 micrometer or more of movement at the head slider.

In general, head suspensions having microactuators mounted on the load beam, or on a planar base plate, are not capable of producing both high resonant frequencies and high stroke simultaneously. Modifications of a planar base plate in order to reduce stiffness and achieve high stroke usually result in a degradation in the resonance performance and a corresponding frequency drop. In the present invention, however, placement of the microactuators 60 onto the relatively thick base plate 40 (verses the relatively thin load beam 30) results in a reduction in the effect of the microactuators 60 on resonant frequencies of the head suspension assembly 10. As a result, relatively high resonant frequencies with relatively high stroke values are possible. In one embodiment, a stroke value of ±1.23 micrometers can be achieved at a sway frequency of 10.6 kilohertz, and in another embodiment, a stroke value of ±0.92 micrometers can be achieved at a sway frequency of 15.5 kilohertz. The relatively vertical side rails 50 also help increase the stiffness of the base plate 40, thereby improving resonant frequencies of the head suspension assembly 10. Increases in the resonant frequencies have the further beneficial effect of reducing, and preferably minimizing, windage effects.

Mounting of the microactuators 60 to the thicker base plate 40 also improves the gram share through the microactuators 60 by reducing the gram share to about less than one percent. Although elimination of gram share is theoretically preferred, in practice, reducing this force to the lowest amount possible is best for the head suspension assembly 10 and the microactuators 60.

The present invention provides a base plate and a head suspension assembly including a base plate. The head suspension assembly may also have a flexure and a load beam to which the flexure is mounted on one end and to which the base plate is mounted on the other end.

The base plate includes a pair of side rails that are preferably integrally formed from the base plate out of the plane of the base plate, and bounding an opening formed within the base plate. The side rails each include a spring portion adjacent the opening. Mounted to the base plate and positioned to span the opening is at least one microactuator configured to provide fine movement of the a head slider mounted to the flexure at a distal end by causing longitudinal expansion and/or contraction of the base plate at the spring portions of the side rails. Movement of the head slider has both lateral and slight rotational components.

Figure 5:
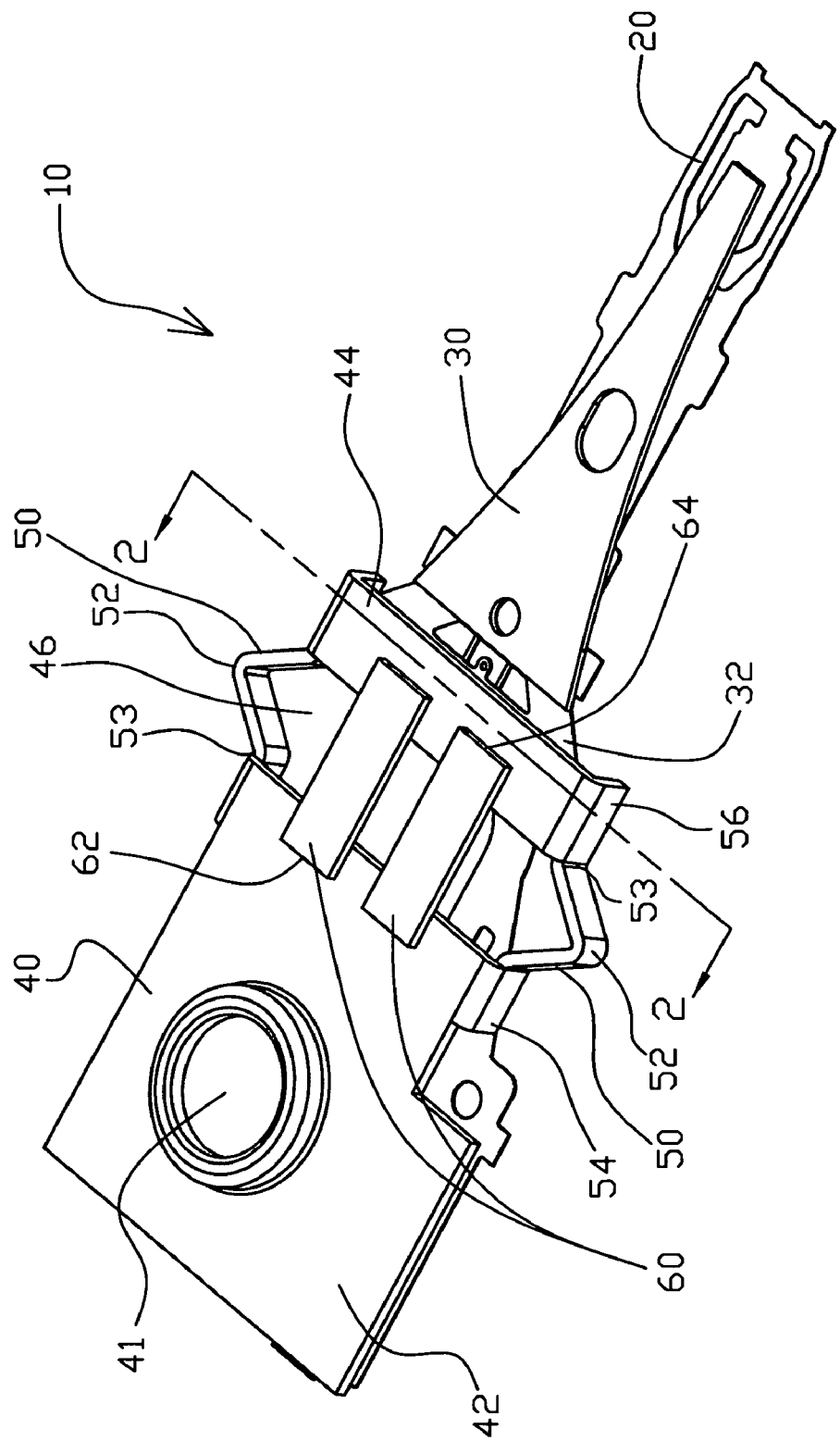
FIG. 5 is a perspective view of a head suspension assembly including a base plate in accordance with an alternative embodiment of the present invention.

The side rails may be configured to be substantially perpendicular to the plane of the base plate. The side rails may also be configured to extend from the plane of the base plate on the side away from the flexure, or may extend from the plane of the base plate on the side of the flexure (as shown in FIG. 5). The spring portions may have a 'V' shape (symmetrical or nonsymmetrical), 'U' shape, corrugated or accordion shape, square or rectangular shape or other suitable shape. The spring portions may be configured to protrude outwardly away from the base plate or inwardly toward the base plate, in a plane substantially parallel to the plane of the base plate. In addition, the spring portions may be formed to be symmetrical about a longitudinal axis of the head suspension assembly.

The base plate may be configured to include a drive mounting region and a load beam mounting region separated by the opening in the base plate and integrally connected by the side rails. The load beam mounts to the load beam mounting region and the drive mounting region includes a boss for connection to the actuator arm of the disk drive.

The invention also includes a method for forming a base plate of the present invention. The method includes the step of providing a base plate portion including an opening bounded by base plate material. Another step includes forming a spring portion in the base plate material adjacent the opening, which may result in a decrease in the size of the opening. Yet another step includes forming side rails from the base plate material adjacent the opening, with the side rails being out of plane relative to the plane of the base plate and preferably substantially perpendicular to the plane of the base plate. Even yet another step includes mounting a load beam to the base plate having the side rails that include the integrally formed spring portions. A further step includes mounting at least one microactuator to the base plate with the microactuator positioned to span the opening.

The step of forming the spring portion may include bending the base plate material to form a 'V' shape (symmetric or non-symmetric), a 'U' shape, an accordion or corrugated shape, a square or rectangular shape or other suitable shape. The step of forming the side rails may include bending the base plate material to be substantially perpendicular to the plane of the base plate.

The invention claimed is:

1. A head suspension assembly for supporting a head slider in a rigid disk drive, the head suspension assembly comprising:
    a load beam having a proximal end, a distal end, and a spring region having a thickness; and
    a base plate coupled to the load beam at the proximal end, the base plate including first and second portions having thicknesses greater than the thickness of the load beam spring region and joined by a pair of side rails extending out of a plane of the base plate, the side rails providing for relative motion between the first and second portions of the base plate.

2. The head suspension assembly of claim 1, wherein each side rail is integrally formed in the base plate of base plate material.

3. The head suspension assembly of claim 1, wherein each side rail includes a spring portion positioned adjacent to an opening formed between the first and second portions of the base plate, and wherein the relative motion of the base plate includes actuation of the spring portions.

4. The head suspension assembly of claim 3, further comprising a microactuator mounted to the base plate and positioned to span the base plate opening for providing relative movement between the first and second portions.

5. The head suspension assembly of claim 3, wherein each spring portion comprises a configuration selected from the group consisting of 'V' shape, 'U' shape, 'S' shape, square, rectangular, sinusoidal, corrugated and accordion pleated.

6. The head suspension assembly of claim 3, wherein the pair of spring portions are symmetrically configured about a longitudinal axis of the head suspension assembly.

7. The head suspension assembly of claim 3, wherein each spring portion protrudes outwardly from an edge of the base plate in a direction away from the base plate opening.

8. The head suspension assembly of claim 3, wherein each spring portion protrudes inwardly from an edge of the base plate in a direction toward the base plate opening.

9. The head suspension assembly of claim 1, further comprising a flexure at the distal end of the load beam, the flexure configured to support a head slider.

10. The head suspension assembly of claim 1, wherein the pair of side rails are each substantially perpendicular to the plane of the base plate.

11. The head suspension assembly of claim 1, wherein the pair of side rails extend away from the plane of the base plate on a side of the base plate on which a flexure is located.

12. The head suspension assembly of claim 1, wherein the pair of side rails extend away from the plane of the base plate on a side of the base plate opposite the side on which a flexure is located.

13. The head suspension assembly of claim 1, wherein the first portion comprises a drive mounting region and the second portion comprises a load beam mounting region separated from the drive mounting region by the base plate opening, the load beam mounting region integrally connected to the drive mounting region by the pair of side rails and the load beam mounting; region coupled to the load beam.

14. The head suspension assembly of claim 13, wherein the drive mounting region comprises a boss for attachment of the head suspension assembly to an actuator arm of the disk drive.

15. The head suspension assembly of claim 1, wherein the first portion of the base plate is configured for attachment to a primary actuator of the disk drive and wherein the second portion of the base plate is attached to the load beam proximal end.

16. The head suspension assembly of claim 15, wherein the first portion of the base plate includes a swaging boss tower for attachment to a primary actuator.

17. The head suspension assembly of claim 15, wherein the head suspension assembly further includes welds for attaching the load beam proximal end to the second portion of the base plate.

18. The head suspension assembly of claim 1, wherein the base plate comprises one piece of material.

19. The head suspension assembly of claim 1, wherein the base plate comprises one piece of material and the first portion, second portion, and side rails all have a thickness greater than a thickness of the load beam.

20. A base plate for use in connection with a disk drive head suspension including a spring region having a thickness, the base plate comprising a pair of rails extending out of a plane of the base plate and bounding a base plate opening and having a thickness greater than the head suspension spring region thickness.

21. The base plate of claim 20, further comprising a drive mounting region and a load beam mounting region separated from the drive mounting region by the base plate opening, with the load beam mounting region connected to the drive mounting region by the pair of rails.

22. The base plate of claim 21, wherein the pair of rails are integrally formed in the base plate of base plate material.

23. The base plate of claim 20, wherein each rail includes a spring portion adjacent to the base plate opening.

24. The bast plate of claim 23, further comprising a microactuator mounted to the base plate and positioned to span the base plate opening, the microactuator configured to provide fine movement of the head slider mounted to head suspension assembly by causing longitudinal expansion and contraction of the base plate at the spring portions of the pair of rails.

25. The base plate of claim 23, wherein each spring portion comprises a configuration selected from the group consisting of 'V' shape, 'U' shape, 'S' shape, square, rectangular, sinusoidal, corrugated and accordion pleated.

26. The base plate of claim 23, wherein the pair of spring portions are symmetrically configured about a longitudinal axis of the base plate.

27. The base plate of claim 23, wherein each spring portion protrudes outwardly from an edge of the base plate in a direction away from the base plate opening.

28. The base plate of claim 23, wherein each spring portion protrudes inwardly from an edge of the base plate in a direction toward the base plate opening.

29. The base plate of claim 20, wherein the pair of rails are each substantially perpendicular to the plane of the base plate.

30. The base plate of claim 20, wherein the pair of rails extend away from the plane of the base plate on a side of the base plate on which a flexure is located.

31. The base plate of claim 20, wherein the pair of rails extend away from the plane of the base plate on a side of the base plate opposite the side on which a flexure is located.

32. The base plate of claim 20, wherein the base plate includes a first portion adapted for attachment to a primary actuator of the disk drive and a second portion adapted for attachment to a load beam, and wherein the rails provide for transverse movement between the first and second portions.

33. The base plate of claim 32, wherein the first portion of the base plate includes a swaging boss tower for attachment to a primary actuator.

34. The base plate of claim 32, wherein the second portion of the base plate is adapted for welding attachment to a load beam.

35. A method of forming a base plate having spring rails, the method comprising the steps of:
  providing a planar base plate portion for use in connection with a disk drive head suspension including a spring region having a thickness, including an opening surrounded by base plate material and a spring portion in the base plate material adjacent to the opening and having a thickness greater than the head suspension spring region thickness; and
  forming spring rails from the spring portion adjacent to the opening, the spring rails formed out of the plane of the base plate.

36. The method of claim 35, wherein the step of providing a spring portion comprises forming the spring portion by decreasing a size of the opening.

37. The method of claim 36, wherein the step of forming the spring portion comprises forcing the base plate material adjacent the opening in a direction generally perpendicular to the plane of the base plate.

38. The method of claim 36, wherein the step of forming the spring portion comprises forming a pair of spring portions flanking the opening.

39. The method of claim 36, wherein the spring portion comprises a configuration selected from the group consisting of 'V' shape, 'U' shape, 'S' shape, square, rectangular, sinusoidal, corrugated and accordion pleated.

40. The method of claim 35, wherein the spring rails are substantially perpendicular to the plane of the base plate.

41. The method of claim 35, wherein the step of forming the spring rails comprises bending the base plate material adjacent the opening.

42. The method of claim 35, further comprising the step of mounting a microactuator to the base plate so as to span the opening.

43. The method of claim 35, further comprising the step of mounting a load beam to the base plate so as to produce a head suspension assembly.

44. The method of claim 35, further including forming a swaging boss tower in the base plate portion.

* * * * *